July 20, 1937.   L. T. CHYLACK   2,087,502
SPECTACLES
Filed Feb. 28, 1936
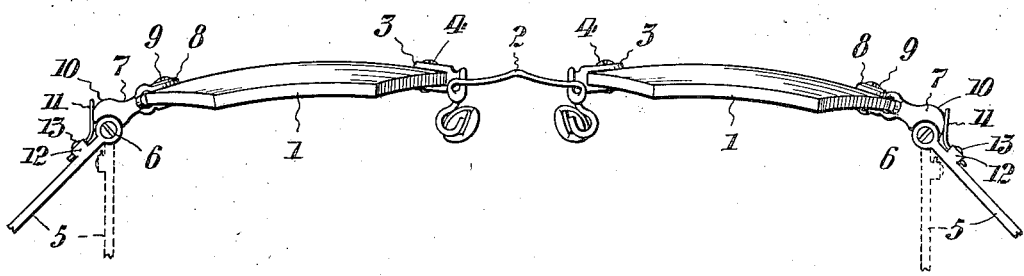
FIG. I
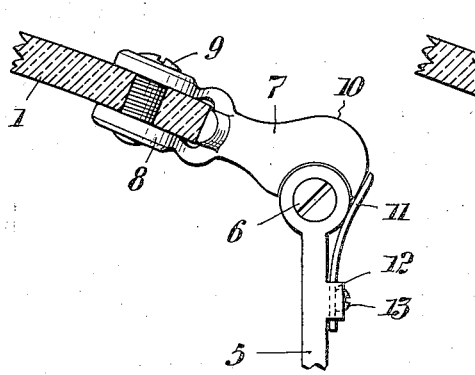
FIG. II
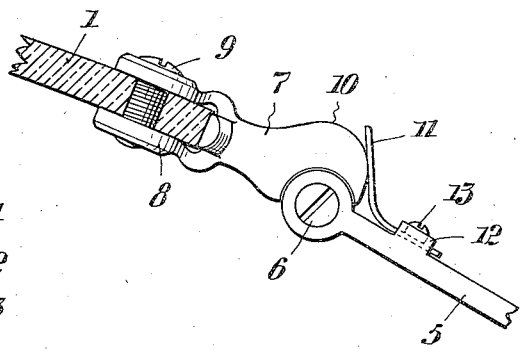
FIG. III
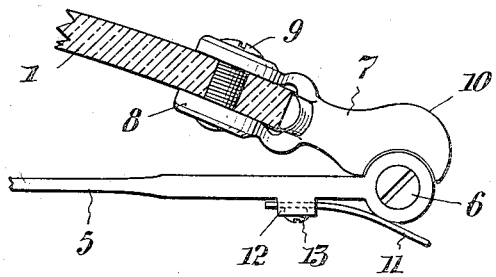
FIG. IV
WITNESSES:
John C. Bergner
Hubert Fuchs
INVENTOR:
Leo T. Chylack,
BY Frailey Paul
ATTORNEYS.

Patented July 20, 1937

2,087,502

UNITED STATES PATENT OFFICE 2,087,502

SPECTACLES

Leo T. Chylack, Allentown, Pa.

Application February 28, 1936, Serial No. 66,147

4 Claims. (Cl. 88—53)

This invention relates to spectacles, and it has reference more particularly to what are ordinarily known as rimless spectacles, that is to say, spectacles wherein the lenses are without peripheral reinforcement.

In spectacles of the type specifically referred to, as ordinarily constructed, the end pieces whereto the bows or temples are hinged, are directly secured by screws that pass through the lenses, and moreover formed with rigid stops which limit the outward swing of said temples. Thus, in applying the spectacles to or removing them from the head, the temples are often forced apart to an extent which induces torsional strain on the end pieces beyond the power of the glass of the lenses to withstand, with the result that the latter break across the apertures through which the securing screws for said end pieces pass.

My invention is directed toward precluding the above contingency, which objective I realize in practice as hereinafter more fully disclosed, through provision of spring means on the temples adapted, by cooperation with camming surfaces on end pieces, to yieldingly resist outward swinging of the temples beyond their normal full open position and thereby relieve the lenses of the breaking strains which would otherwise be induced in them as heretofore.

Other objects and attendant advantages will appear from the following detailed description of the attached drawing, wherein Fig. I is a view, in plan, of a pair of rimless spectacles conveniently embodying my invention, the end portions of the temples having been broken away for conservation of space.

Fig. II is a fragmentary detail view partly in elevation and partly in section showing the hinge connection for one of the temples, with the temple in its normal full open position.

Fig. III is a view corresponding to Fig. II showing the temple swung outward beyond the normal position; and Fig. IV is likewise a view similar to Fig. II showing the temple in closed position.

The rimless spectacles illustrated in Fig. I are generally of well known construction, comprising the lenses 1, and the connecting bridge piece 2 with its clevises 3 engaging over the contiguous edge portions of the lenses 1 and secured by screws 4 passing through said lenses. The bows or temples 5 of the spectacles are hingedly connected by screws 6 to outwardly projecting "shoulders" or end pieces 7, which, like the bridge piece 2, are formed with clevises 8 to engage over the edges of the lenses and which are also secured by screws 9 passing through said lenses.

Instead of being provided with stops to limit the outward swing of the temples 5 as ordinarily, the end pieces 7, in accordance with my invention, are provided with rounded camming surfaces 10 having a curvature eccentric to the pivots 6. Adapted to coact with the camming surfaces 10 of the end pieces 7 are small spring tongues 11, which, at one end, are secured in apertured anchorage lugs 12 projecting from the outer sides of the temples 5 adjacent the hinge connections 6 by means of screws 13.

With the temples 5 in their normal open positions as shown in dotted lines in Fig. I and in full lines in Fig. II, the spring tongues 11 are substantially relaxed and bear against the edges of the pivot ears of said temples. However, when the temples are swung outward beyond the normal full open position as shown in Figs. I and III, the spring tongues 11 coact with the camming surfaces 10 on the end pieces 7 in yieldingly resisting such movement, thereby absorbing in part the torsional strain on said end pieces 10 and to a like degree reducing the breaking strain induced in the lenses. Fig. IV shows the temples in closed position, in which position the spring tongues 11 are relaxed with their free ends bearing upon the ears of said temples in the same manner as described in connection with Fig. II.

From the foregoing it will be apparent that I have provided very simple, inexpensive and inconspicuous means for yieldingly restraining outward movement of the temples beyond the normal full open position and thereby minimizing the possibility of lens breakage in careless handling of the spectacles when they are applied to or removed from the head. While I have particularly described my invention in connection with rimless eye-glasses it will be apparent to those skilled in the art, that it can be as readily embodied in rimmed spectacles with attainment of advantages equal in all respects to those hereinbefore pointed out.

Having thus described my invention, I claim:

1. Spectacles comprising a pair of lenses; means connecting the lenses; temples; projections laterally beyond the lenses to which the temples are respectively pivoted, said projections having rounded cam edges eccentric to the pivot centers; and spring fingers at the outer sides of the temples adapted to coact tangentially with the cam edges aforesaid in yieldingly resisting movement of said temples beyond their normal open positions.

2. Spectacles comprising a pair of lenses; means connecting the lenses; temples; projections extending laterally beyond the lenses to which the temples are respectively pivoted, said projections having rounded cam edges eccentric to the pivot centers; and outwardly flexing spring fingers anchored in lugs at the outer sides of the temples adjacent the pivots and adapted to coact tangentially with the cam edges aforesaid in yieldingly resisting movement of said temples beyond their normal open positions.

3. Rimless spectacles comprising a pair of lenses; a bridge connecting the contiguous edge portions of the lenses; temples; laterally projecting end members secured to the outer portions of the lens edges to which the temples are respectively pivoted, said end members having rounded cam edges eccentric to the pivot centers; and spring fingers at the outer sides of the temples adapted to coact tangentially with the cam edges aforesaid in yieldingly resisting movement of said temples beyond their normal open positions.

4. Rimless spectacles comprising a pair of lenses; a bridge connecting the contiguous edge portions of the lenses; temples; laterally projecting end members secured to the outer portions of the lens edges to which the temples are respectively pivoted, said end members having rounded cam edges eccentric to the pivot centers; and spring fingers anchored in lugs at the outer sides of the temples adjacent the pivots and adapted to coact tangentially with the cam edges aforesaid in yieldingly resisting movement of said temples beyond their normal open positions.

LEO T. CHYLACK.